US006895379B2

(12) United States Patent
Smyers et al.

(10) Patent No.: US 6,895,379 B2
(45) Date of Patent: May 17, 2005

(54) METHOD OF AND APPARATUS FOR CONFIGURING AND CONTROLLING HOME ENTERTAINMENT SYSTEMS THROUGH NATURAL LANGUAGE AND SPOKEN COMMANDS USING A NATURAL LANGUAGE SERVER

(75) Inventors: Scott David Smyers, San Jose, CA (US); Glen David Stone, Los Gatos, CA (US); Bruce Alan Fairman, Woodside, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 51 days.

(21) Appl. No.: 10/112,244

(22) Filed: Mar. 27, 2002

(65) Prior Publication Data

US 2003/0187646 A1 Oct. 2, 2003

(51) Int. Cl.[7] ............................................... G10L 15/00
(52) U.S. Cl. .................................... 704/270.1; 704/275
(58) Field of Search ............................. 704/270, 270.1, 704/275; 707/5; 379/88.01

(56) References Cited

U.S. PATENT DOCUMENTS

| 4,641,238 | A | | 2/1987 | Kneib ......................... 364/200 |
| 5,086,385 | A | * | 2/1992 | Launey et al. .............. 704/270 |
| 5,809,459 | A | | 9/1998 | Bergstrom et al. .......... 704/223 |
| 5,960,399 | A | * | 9/1999 | Barclay et al. ........... 704/270.1 |
| 6,052,439 | A | * | 4/2000 | Gerszberg et al. ....... 379/88.01 |
| 6,078,886 | A | * | 6/2000 | Dragosh et al. ............ 704/270 |
| 6,173,279 | B1 | * | 1/2001 | Levin et al. .................... 707/5 |

FOREIGN PATENT DOCUMENTS

EP 0 854 418 A2 * 7/1998 ............. G06F/3/16

OTHER PUBLICATIONS

"A bus on a Diet–The Serial Bus Alternative" An Introduction to the P1394 High Performance Serial Bus, by Michael Teener, Apple Computer, Inc., Santa Clara, CA., Publication date: Feb. 24, 1992, pp. 316–321.

"The IEEE–1394 High Speed Serial Bus ", by R.H.J. Bloks, Philips Journal of Research, The Netherlands, vol. 50, No. 1/2, 1996, pp. 209–216.

"P1394 Standard for a High Performance Serial Bus ", Prepared by the High Perfromance Serial Bus Working Group of the Microprocessor and Microcomputer Standards Subcommittee, Copyright 1995 The Institute of Electrical and Eletronic Engineers, Inc., 345 East 4th Street, New York, NY 10017–2394, USA., pp. 1–384.

FDIS manuscript of IEC 61883, "Digital Interface for Consumer Audio/Video Equipment", by Nederlands Elektrotechnisch Comite, Publication date: May 27, 1997, pp. 1–78.

1394 Trade Association, the Multimedia Connection, "TA Document 2001012 AV/C Digital Interface Command Set General Specification Version 4.1", Copyright 1996–2000 by the 1394 Trade association, Regency Plaza Suite 350, 2350 Mission College Blvd., Santa Clara, CA 95054, Publication date: Dec. 11, 2001, pp. 1–108.

* cited by examiner

Primary Examiner—David D. Knepper
(74) Attorney, Agent, or Firm—Haverstock & Owens LLP

(57) ABSTRACT

When a user's request is entered it is then transmitted to a network interface unit which digitizes and stores the request. The digitized request and information about the user's network of devices is then transmitted from the network interface unit to a natural language server, preferably over the internet. The natural language server then processes the request and generates commands necessary to complete the request within the user's network of devices. These commands are then transmitted from the natural language server to the network interface unit. The network interface unit then transmits the commands to the appropriate devices within the network of devices. The devices within the network of devices then execute the received commands to complete the user's request.

38 Claims, 6 Drawing Sheets

METHOD OF AND APPARATUS FOR CONFIGURING AND CONTROLLING HOME ENTERTAINMENT SYSTEMS THROUGH NATURAL LANGUAGE AND SPOKEN COMMANDS USING A NATURAL LANGUAGE SERVER

FIELD OF THE INVENTION

The present invention relates to the field of controlling devices within a network of devices. More particularly, the present invention relates to the field of controlling devices within a network of devices through spoken commands.

BACKGROUND OF THE INVENTION

The IEEE standard, "IEEE 1394-2000 Standard For A High Performance Serial Bus." Draft ratified in 2000, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-2000 serial bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-2000 standard provides a high-speed serial bus for interconnecting digital devices thereby providing a universal I/O connection. The IEEE 1394-2000 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-2000 standard is very thin in size compared to other bulkier cables used to connect such devices. Devices can be added and removed from an IEEE 1394-2000 bus while the bus is active. If a device is so added or removed the bus will then automatically reconfigure itself for transmitting data between the then existing nodes. A node is considered a logical entity with a unique address on the bus structure. Each node provides a configuration ROM, a standardized set of control registers and its own address space. Because of these advantages the IEEE 1394-2000 standard provides for a unique networking structure that is capable of incorporating audio/video devices, media play/record devices, computing devices and display devices.

The IEEE 1394-2000 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394-2000 cable. The physical layer 16 also provides arbitration to ensure that all devices coupled to the IEEE 1394-2000 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The transaction layer 12 also provides a path for isochronous management data to be transferred to the serial bus management block 10 via read operations with isochronous control compare-swap registers. The serial bus management block 10 contains an isochuonous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

A diverse range of products can be implemented with the ability to connect to an IEEE 1394-2000 serial bus network. These devices can have capabilities and functionality ranging from very simple to very complex. Specifically, a variety of audio/video devices, media play/record devices and computing/display devices are capable of being linked together over an IEEE 1394-2000 serial bus networking structure to support asynchronous and isochronous data transfers between the devices.

The IEEE 1394-2000 cable environment is a network of nodes connected by point-to-point links, including a port on each node's physical connection and the cable between them. The physical topology for the cable environment of an IEEE 1394-2000 serial bus is a non-cyclic network of multiple ports, with finite branches. The primary restriction on the cable environment is that nodes must be connected together without forming any closed loops.

Each node on the IEEE 1394-2000 bus structure has a 16 bit node ID. The node ID is the address that is used for data transmission on the data link layer. This allows address space for potentially up to 64K nodes on the bus structure. The node ID is divided into two smaller fields: the higher order 10 bits specify a bus ID and the lower order 6 bits specify a physical ID. The bus ID is assigned by a root node and the physical ID is assigned during a self identify sequence upon reset of the bus. Each physical ID field is unique within a single IEEE 1394-2000 bus, but the physical ID field is not a fixed value for each node itself. The physical ID field is fixed for the position of the node within the bus structure. If a device is moved from one position in the IEEE 1394-2000 bus to another position within the same IEEE 1394-2000 bus, the device will have a different node ID because its physical ID will have a different value when in the new position. Within each of the bus ID and physical ID fields a value of all logical "1"s is reserved for special purposes. Accordingly, this addressing scheme provides for up to 1023 busses, each with 63 independently addressable nodes.

Each IEEE 1394-2000 compatible device includes a node unique ID which is a 64 bit number saved within a configuration read-only memory (ROM) of the device. The node unique ID is permanent for each device and does not depend on the position of the device within an IEEE 1394-2000 bus.

The node unique ID is not used for addressing of data transmissions on the data link layer.

A bus reset occurs when the bus is somehow reconfigured, either by the removal of a node from the bus or the addition of a node to the bus or when a device attached to the bus is powered off. When a bus reset occurs, all nodes are forced into a special state that clears all topology information and starts a next phase. After a bus reset, the only information known to a node is whether the node is a branch node, a leaf node or an isolated node. A branch node has more than one directly connected neighbors A leaf node has only a single neighbor. An isolated node is unconnected. After a bus reset, a tree identification process is performed. During the tree identification process, the general network topology is determined and translated into a tree. One node within the network is designated as a root node and all of the physical connection are associated with a direction pointing towards the root node. From each port it is determined if there is a connection and if the connection is to a child or parent node. The direction is set by labeling each connected port as either a parent port or a child port. A parent port is a port connected to a node further from the root than the reporting node. From these relationships, the root node determines the physical topology of the devices connected to the IEEE 1394-2000 serial bus network.

After the tree identification process, a self identifying process is performed. During the self identifying process, each node connected to the IEEE 1394-2000 serial bus network selects a unique physical ID, in order, and transmits that physical ID and other management information to the other nodes on the bus. The physical ID is a number equal to the count of the number of times since the reset event that a node has passed through the state of receiving self identifying information before having its own opportunity to send self identifying information. This self identifying process allows a node connected to the IEEE 1394-2000 serial bus network to be aware of the other nodes connected to the bus.

Speech recognition systems are known which permit a user to interface with a computer system using spoken language. The speech recognition system receives spoken input from the user, interprets the input, and then translates the input into a form that the computer system understands.

Speech recognition systems typically recognize spoken words or utterances based upon an acoustic model of a person who is speaking (the speaker). Acoustic models are typically generated based upon samples of speech. When the acoustic model is constructed based upon samples of speech obtained from a number of persons rather than a specific speaker, this is called speaker-independent modeling. When a speaker-independent model is then modified for recognizing speech of a particular person based upon samples of that person's speech, this is called adaptive modeling. When a model is constructed based solely on the speech of a particular person, this is timed speaker-dependent modeling.

Speaker-independent modeling generally enables a number of speakers to interface with the same recognition system without having obtained prior samples of the speech of the particular speakers. In comparison to speaker-independent modeling, adaptive modeling and speaker-dependent modeling generally enable a speech recognition system to more accurately recognize a speaker's speech, especially if the speaker has a strong accent, has a connection which produces unusual channel characteristics or for some other reason is not well modeled by speaker independent models.

Speech recognition systems are known which provide a telephonic interface between a caller and a customer service application. For example, the caller may obtain information regarding flight availability and pricing for a particular airline and may purchase tickets utilizing spoken language and without requiring assistance from an airline reservations clerk. Such customer service applications are typically intended to be accessed by a diverse population of callers and with various background noises. In such applications, it would be impractical to ask the callers to engage in a training session prior to using the customer service application. Accordingly, an acoustic model utilized for such customer service applications must be generalized so as to account for variability in the speakers. Thus, speaker-independent modeling is utilized for customer service applications. A result of using speaker-independent modeling is that the recognition system is less accurate than may be desired. This is particularly true for speakers with strong accents and those who have a phone line which produces unusual channel characteristics.

Natural language interpreters are well known and used for a variety of applications. One common use is for an automated telephone system. It will be apparent to those of ordinary skill in the art that these techniques can and have been applied to a variety of other uses. For example, one currently can use such a system to purchase travel tickets, to arrange hotel reservations, to trade stock, to find a telephone number or extension, among many other useful applications.

For a natural language interpreter used in conjunction with a speech recognition system, the natural language interpreter is provided the speech recognizer's best determination of each word resulting from the recognition operation. A speech recognizer 'listens' to a user's spoken words, determines what those words are and presents those words in a machine format to the natural language interpreter. As part of the recognition operation, each word is provided a word confidence score which represents the confidence associated with each such word that the speech recognizer has for the accuracy of its recognition. Thus, it is generally considered useful to take into account the accent or speech patterns of a wide variety of users. A score is generated and associated with each word in the recognition step. Using the scores for each individual word is not entirely satisfactory because that collection of scores does not relate to the meaning the speaker intends to convey. If a single word has a very low word confidence score, the user may be required to re-enter the request.

Voice recognition techniques are currently used to enter data into a document being generated by the user on a computer system. For example, a voice recognition application program is available from Dragon Systems, Inc., which enables a user to enter text into a written document by speaking the words to be entered into a microphone attached to the user's computer system. The application interprets the spoken words and translates them into typographical characters which then appear in the written document displayed on the user's computer screen.

Currently, there is a lack of a method or system which allows a user to control one or more devices within a network of devices through natural language or spoken commands. There is also currently a lack of a method or system which allows a user to obtain information from one or more devices within a network of devices through natural language or spoken commands.

SUMMARY OF THE INVENTION

A method of and apparatus for configuring and controlling home entertainment systems through natural language and spoken commands using a natural language server allows a user to enter a natural language request within a network of devices. When a user's request is entered it is then transmitted to a network interface unit which digitizes and stores the request. The digitized request and information about the user's network of devices is then transmitted from the network interface unit to a natural language server, preferably over the internet. The natural language server then processes the request and generates commands necessary to complete the request within the user's network of devices. These commands are then transmitted from the natural language server to the network interface unit. The network interface unit then transmits the commands to the appropriate devices within the network of devices. The devices within the network of devices then execute the received commands to complete the user's request.

In one aspect of the present invention, a method of configuring and controlling a network of devices through a natural language request comprises receiving a natural language request from a user, storing the natural language request, transmitting the natural language request to a natural language server, generating commands to complete the natural language request using the network of devices and transmitting the commands to appropriate devices within the network of devices to complete the natural language request. The method further comprises determining intention of the natural language request at the natural language server. Transmitting the natural language request to a natural language server includes transmitting information about configuration of the network of devices. Transmitting the natural language request to a natural language server is completed by a network interface unit within the network of devices and transmitting the commands to appropriate devices within the network of devices includes transmitting the commands to the network interface unit and then transmitting the commands from the network interface unit to the appropriate devices within the network of devices. The natural language request is preferably a selective one of a spoken request and a request entered using an input device. The natural language request is preferably requesting a selective one of information and a control action to be performed within the network of devices. The natural language server is preferably remote from the network of devices. The natural language server is preferably accessed over an internet connection. The natural language server is alternatively included within the network of devices. The network of devices preferably substantially complies with a version of the IEEE 1394 standard.

In another aspect of the present invention, a network interface unit for receiving a natural language request from a user, the network interface unit comprises a first interface circuit configured to communicate with one or more devices within a network of devices to receive the natural language request from the user, a second interface circuit configured to communicate with a natural language server to transmit the natural language request to the natural language server and to receive commands back from the natural language server to execute the natural language request within the network of devices and a control circuit coupled to the first interface circuit to control the communication with the one or more devices and to the second interface circuit to control the communication with the natural language server, wherein when the natural language request is received by the first interface circuit, the natural language request is transmitted to the natural language server and further wherein when the commands are received back from the natural language server, the commands are transmitted from the first interface circuit to the network of devices to execute the natural language request. Information about configuration of the network of devices is also transmitted to the natural language server. The natural language request is preferably a selective one of a spoken request and a request entered using an input device. The natural language request is requesting a selective one of information and a control action to be performed within the network of devices. The natural language server is preferably remote from the network of devices. The second interface circuit preferably provides an internet connection though which the natural language server is accessed. The natural language server is alternatively included within the network of devices. In this alternative embodiment, the first and second interface circuits are integrated into a single interface circuit. The network of devices preferably substantially complies with a version of the IEEE 1394 standard.

In a further aspect of the present invention, a natural language server for receiving a natural language request and generating commands to complete the natural language request within a network of devices, the natural language server comprises an interface circuit configured to receive the natural language request from a network interface unit and a control circuit coupled to the interface circuit and configured to process the natural language request and generate commands necessary to execute the natural language request within the network of devices, wherein the commands are transmitted to the network interface unit through the interface circuit. Information about configuration of the network of devices is also received by the interface circuit from the network interface unit. The natural language request is preferably a selective one of a spoken request and a request entered using an input device. The natural language request is preferably requesting a selective one of information and a control action to be performed within the network of devices. The natural language server is preferably remote from the network of devices. The interface circuit preferably provides an internet connection for communicating with the network interface unit. The natural language server is alternatively included within the network of devices. The network of devices preferably substantially complies with a version of the IEEE 1394 standard.

In still a further aspect of the present invention, a network of devices comprises one or more devices, a natural language server comprising a first interface circuit configured to receive a natural language request and a first control circuit coupled to the first interface circuit and configured to process the natural language request and generate commands necessary to execute the natural language request within the one or more devices and a network interface unit comprising a second interface circuit configured to communicate with the one or more devices to receive the natural language request from a user, a third interface configured to communicate with the natural language server to transmit the natural language request to the natural language server and to receive the commands back from the natural language server to execute the natural language request within the one or more devices and a control circuit coupled to the second interface circuit to control the communication with the one or more devices and to the third interface circuit to control the communication with the natural language server, wherein when the natural language request is received by the first second interface circuit, the natural language request is transmitted to the natural language server and further wherein when the commands are received back from the natural language server, the commands are transmitted from the second interface circuit to the one or more devices to execute the natural language request. Information about configuration of the one or more devices is also transmitted from the network interface unit to the natural language server. The natural language request is preferably a selective one of a spoken request and a request entered using an input device. The natural language request is preferably requesting a selective one of information and a control action to be performed by the one or more devices. The natural language server is preferably remote from the one or more devices. The first interface and the third interface preferably communicate over an internet connection. The natural language server is alternatively coupled locally with the one or more devices. In this alternative embodiment, the second and third interface circuits are integrated into a single interface circuit. The one or more devices and the network interface circuit are preferably coupled together within a network substantially complying with a version of the IEEE 1394 standard.

DETAILED DESCRIPTION OF THE PREFERRED EMBODIMENT

A method of and apparatus for configuring and controlling home entertainment systems through natural language and spoken commands using a natural language server allows a user to enter a natural language request within a network of devices. Preferably, the network of devices operates according to the IEEE 1394-2000 standard protocol. The user's request is preferably entered by speaking the request into a microphone within the network of devices. Alternatively, the user enters the natural language request in another manner, such as by using a keyboard or other appropriate input device. Once entered, the user's request is then transmitted to a network interface unit, within the network of devices. When the network interface unit receives the user's request it digitizes and stores the request. The network interface unit then transmits the digitized request and information regarding the configuration of devices within the network of devices to a natural language server.

Preferably, the natural language server is a shared, remote device that is accessed by the network interface unit using an internet connection. This allows the user to save the expense of purchasing the natural language server to include within the user's network of devices. Alternatively, the natural language server is included within the user's network of devices, either as a stand-alone device or incorporated into one of the devices within the network of devices.

When the natural language server receives the digitized request from the network interface unit, the natural language server then determines the intention of the request. The user's request can be for information or to request that a control action be performed related to the devices within the network of devices.

Once the natural language server determines the intention of the request, the natural language server then determines how to complete the request with the devices in the user's network of devices. The natural language server then generates the commands necessary to complete the user's request. The natural language server then transmits the generated commands back to the network interface unit. When the network interface unit receives the commands generated by the natural language server, the network interface unit transmits the commands to the appropriate devices within the network of devices. The devices then execute the commands received from the network interface unit to complete the user's request.

Figure 1:
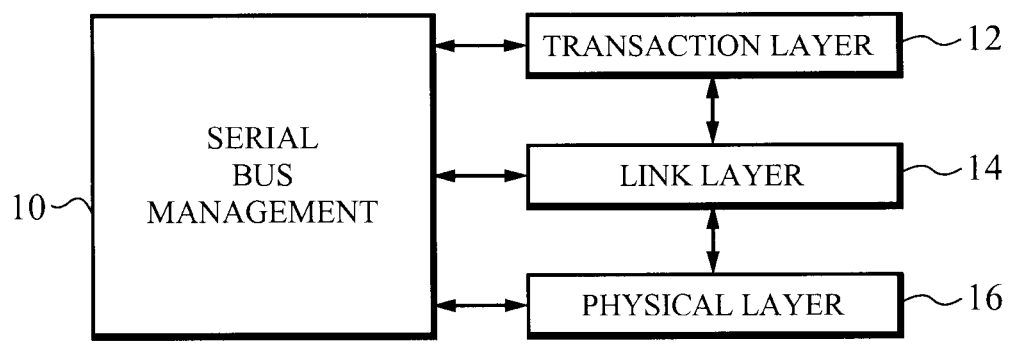
FIG. 1 illustrates a protocol of the IEEE 1394-2000 standard.
Figure 2:
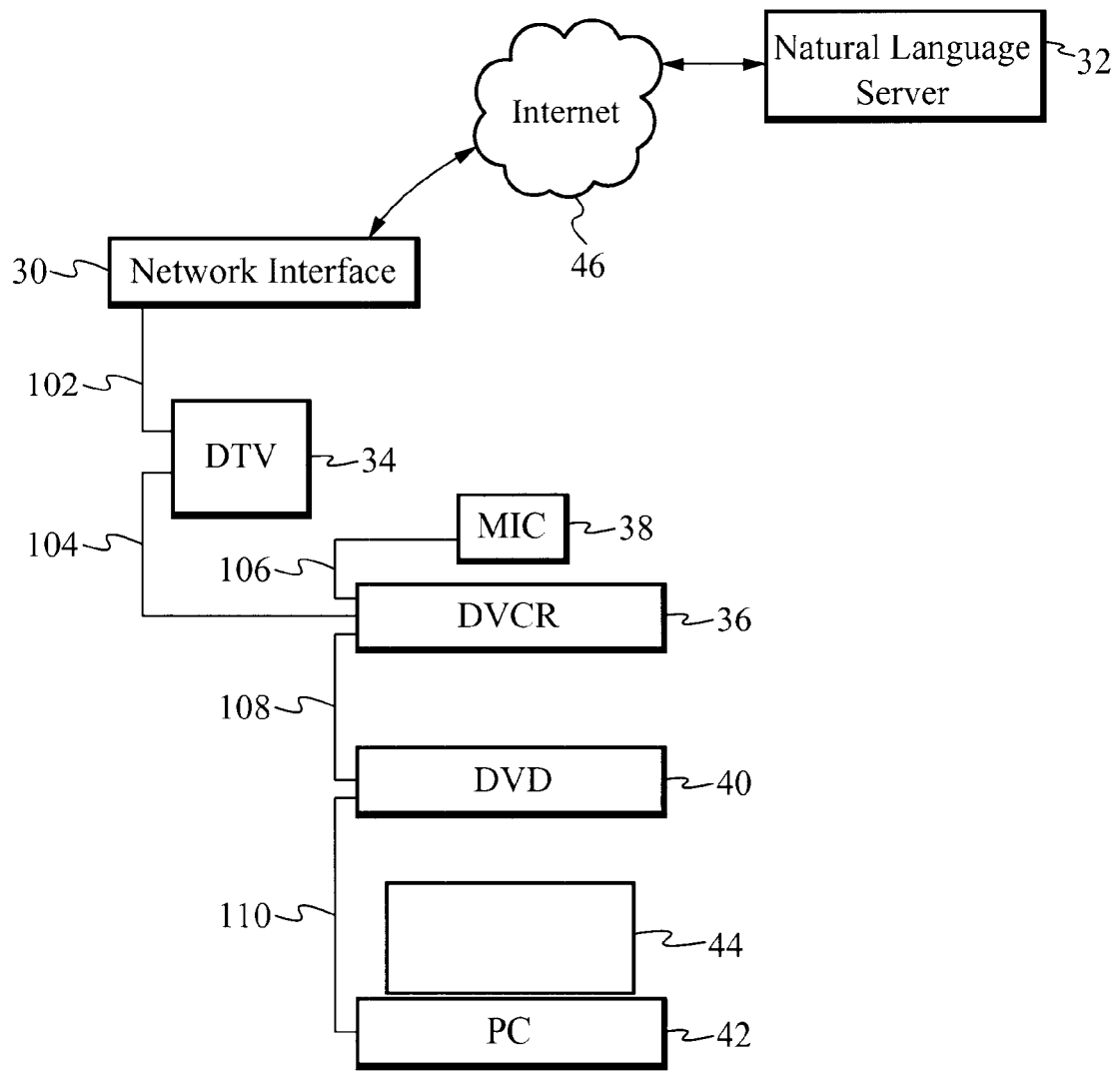
FIG. 2 illustrates an exemplary network of devices including a network interface unit, a digital television, a microphone, a digital VCR, a DVD player and a personal computer.

An exemplary network of devices including a network interface unit 30, a digital television 34, a microphone 38, a digital VCR 36, a DVD player 40 and a personal computer (PC) 42 connected together by IEEE 1394-2000 cables 102, 104, 106, 108 and 110 is illustrated in FIG. 2. The IEEE 1394-2000 cable 110 couples the PC 42 to the DVD player 40. The PC 42 has an associated display 44. The IEEE 1394-2000 cable 108 couples the DVD player 40 to the digital VCR 36. The IEEE 1394-2000 cable 106 couples the digital VCR 36 to the microphone 38. The IEEE 1394-2000 cable 104 couples the digital VCR 36 to the digital television 34. The IEEE 1394-2000 cable 102 couples the digital television 34 to the network interface unit 30. The network interface unit 30 is coupled to a natural language server 32 through an internet connection 46. As will be described below, the natural language server 32 of the present invention is preferably accessed and utilized by the network of devices through an internet connection, so that the natural language server 32 is capable of being accessed by many different networks of devices. Alternatively, the natural language server 32 is located within the network of devices, either as a stand-alone device or integrated within a device within the network of devices. Also, as described above and illustrated in FIG. 2, the microphone 38 is preferably a stand-alone device. Alternatively, the microphone 38 could be integrated into one of the other devices within the network of devices.

The configuration illustrated in FIG. 2 is exemplary only. It should be apparent that a network of devices could include many different combinations of devices and components. The devices within such an IEEE 1394-2000 network are autonomous devices, meaning that in an IEEE 1394-2000 network, such as the one illustrated in FIG. 2, in which a computer is one of the devices, there is not a true "master-slave" relationship between the computer and the other devices. In many IEEE 1394-2000 network configurations, a computer may not be present. Even in such configurations, the devices within the network are fully capable of interacting with each other on a peer basis. It should be recognized that data, commands and parameters can be sent between all of the devices within the IEEE 1394-2000 network, as appropriate.

According to the preferred embodiment of the present invention, a user speaks a request such as "watch and record TV channel 7." This spoken request is detected by the microphone 38 and transmitted to the network interface unit 30 through the IEEE 1394-2000 network. The network interface unit 30 then digitizes and stores this request. Alternatively, the user could enter the natural language request, using a keyboard or other appropriate input device. Once the network interface unit 30 has stored the request, the natural language request is then transmitted over the internet connection 46 to the natural language server 32. The network interface unit 30 also forwards information regarding the configuration of the network of devices to the natural language server 32. This information includes information about the configuration of the devices within the network of devices, as well as information about the type of devices and the control capabilities of each device.

When the natural language server 32 receives the digitized request and the configuration information from the network interface unit 30, the natural language server 32 then applies language recognition and natural language processing techniques, as appropriate, to the request to determine the intention of the user. From the example given above, "watch and record TV channel 7," the natural language server 32 determines that the user wishes to turn on the digital television 34, tune the digital television 34 to channel 7, turn on the digital VCR 36 and setup the digital VCR 36 to receive the IEEE 1394-2000 isochronous channel on which the digital television 34 is transmitting the stream corresponding to channel 7. The natural language server 32 then preferably sends the proper AVC commands to the devices within the network of devices to turn on the digital television 34, select channel 7, using the AVC Tuner subunit, turn on the digital VCR 36, and establish a logical connection between the digital television 34 and the digital VCR 36 using the AVC connection and management command set.

Figure 3A:
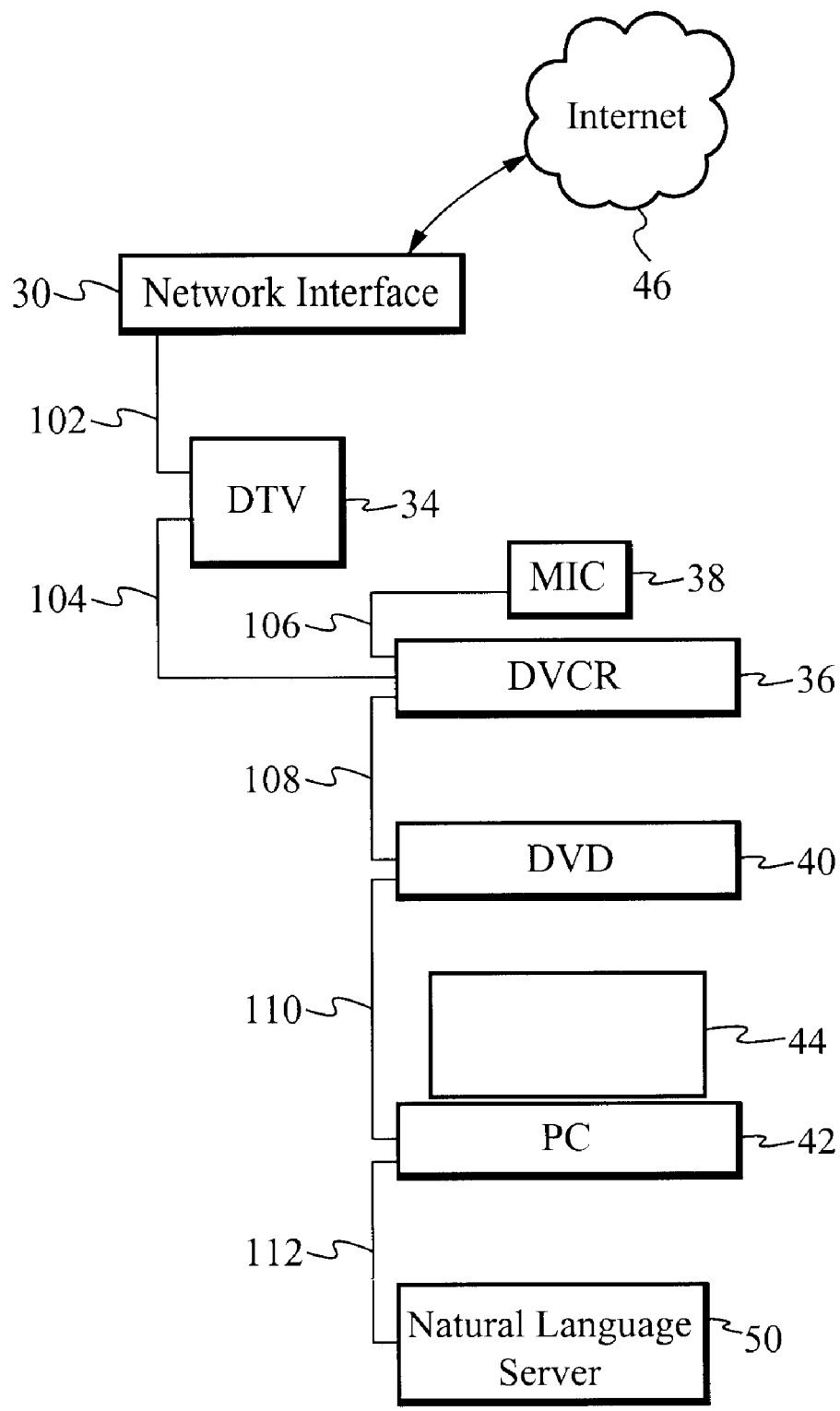
FIG. 3A illustrates a configuration according to an alternate embodiment of the present invention, including a natural language server as a stand-alone device within the user's network of devices.
Figure 3B:
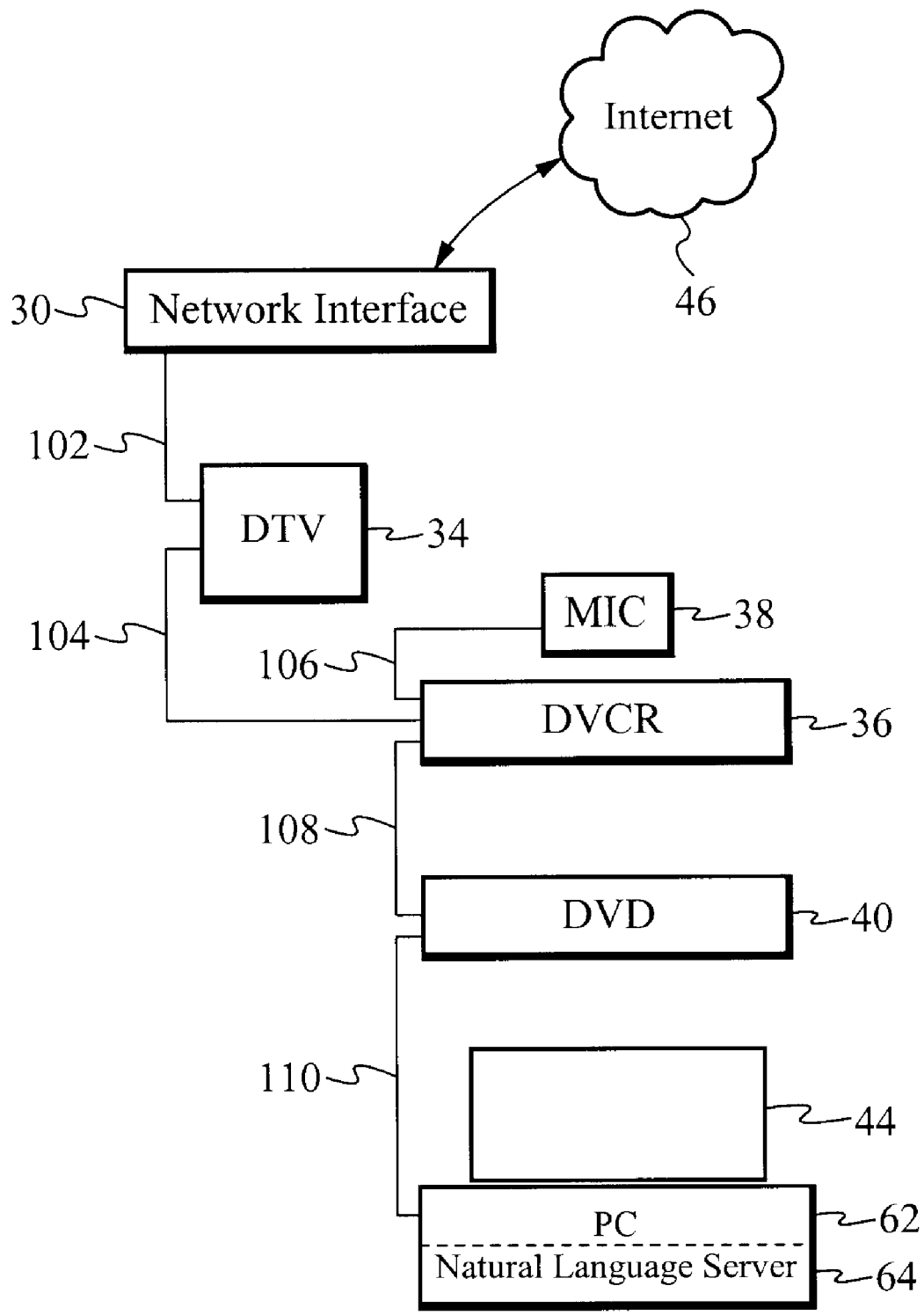
FIG. 3B illustrates a configuration according to an alternate embodiment of the present invention, including a natural language server as an integrated device within the user's network of devices.

In an alternate embodiment of the present invention, the natural language server is located within the network of devices, either as a stand-alone device, as illustrated in FIG. 3A, or within one of the devices within the network, as illustrated in FIG. 3B. In the configuration illustrated in FIG. 3A, the natural language server 50 is coupled to the PC 42 by the IEEE 1394-2000 cable 112. In this configuration, once a user's request is digitized and recorded by the network interface unit 30, the network interface unit 30 then transmits the digitized request to the natural language server 50 over the IEEE 1394-2000 serial bus network. In the configuration illustrated in FIG. 3B, the natural language server 64 is integral to the personal computer 62. In this configuration, once a user's request is digitized and recorded by the network interface unit 30, the network interface unit 30 then transmits the digitized request to the personal computer 62, including the natural language server 64, over the IEEE 1394-2000 serial bus network. It should also be apparent to those skilled in the art, that alternatively, the natural language server and the network interface unit could be integrated into a single device.

Figure 4:
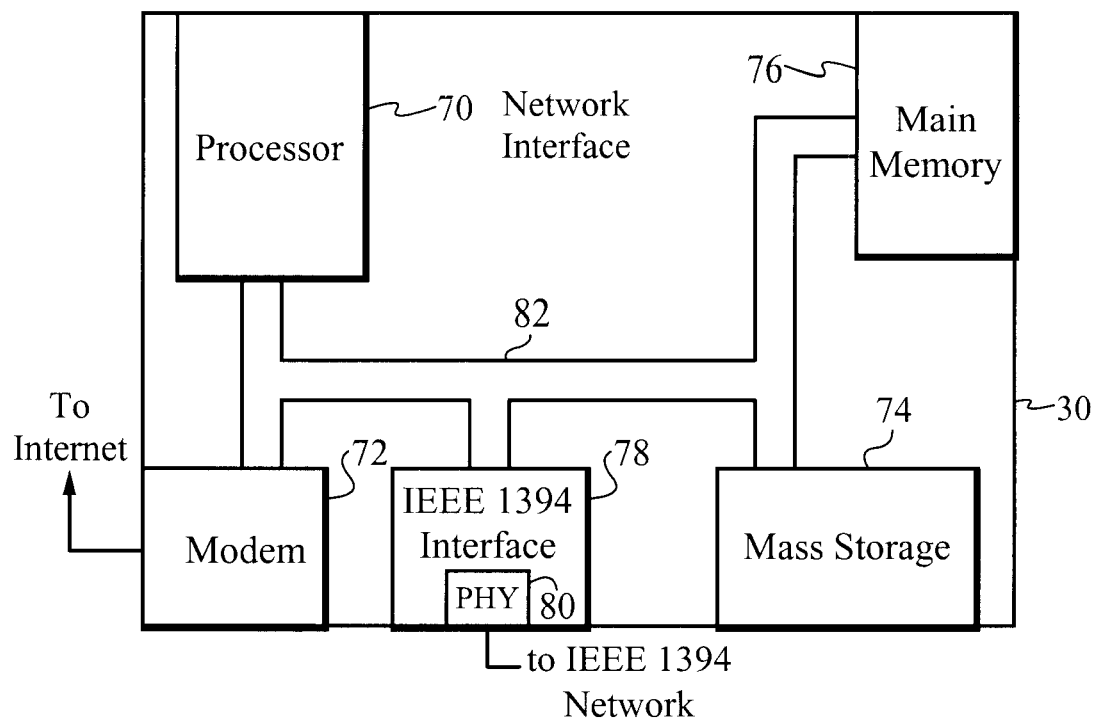
FIG. 4 illustrates a block diagram of the internal components of a network interface unit according to the preferred embodiment of the present invention.

A block diagram of the internal components of the network interface unit 30 is illustrated in FIG. 4. The network interface unit 30 includes a processor 70, a main memory 76, a mass storage device 74, an IEEE 1394-2000 interface circuit 78 and a modem 72, all coupled together by a conventional bidirectional system bus 82. The IEEE 1394-2000 interface circuit 78 includes a physical interface circuit 80 for sending and receiving communications on the IEEE 1394-2000 serial bus. The modem 72 is coupled to the internet connection for sending and receiving communications over the internet 46. The mass storage device 74 may include both fixed and removable media using any one or more of magnetic, optical or magneto-optical storage technology or any other available mass storage technology. The system bus 82 contains an address bus for addressing any portion of the memory 74 and 76. The system bus 82 also includes a data bus for transferring data between and among the processor 70, the main memory 76, the mass storage device 74, the IEEE 1394-2000 interface circuit 78 and the modem 72.

Figure 5:
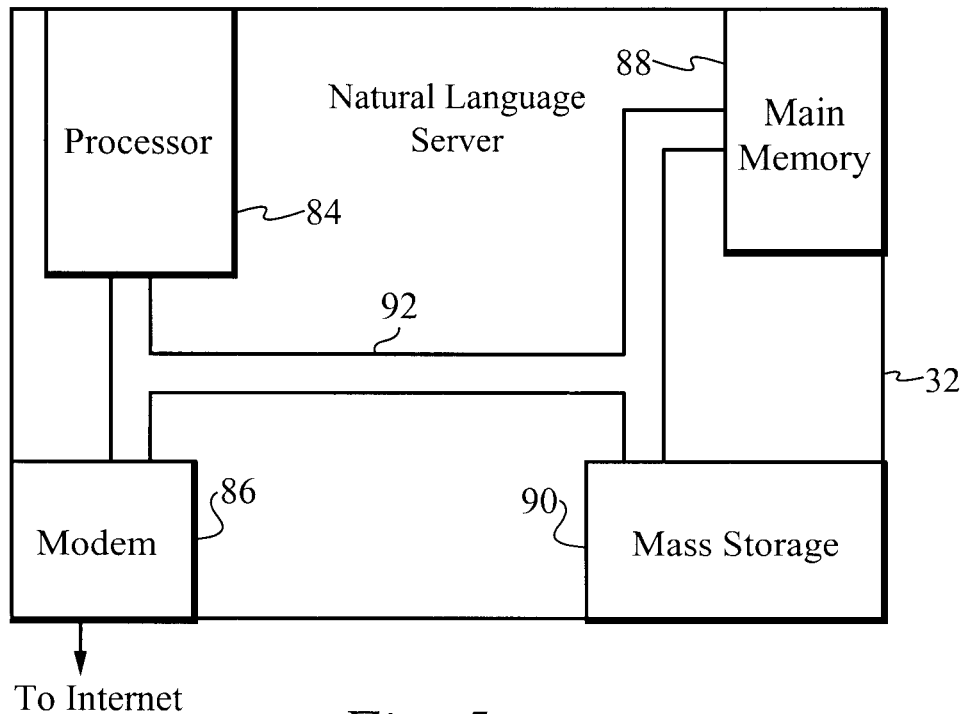
FIG. 5 illustrates a block diagram of the internal components of a natural language server according to the preferred embodiment of the present invention.

A block diagram of the internal components of the natural language server 32 of the preferred embodiment of tie present invention, is illustrated in FIG. 5. The natural language server 32 includes a processor 84, a main memory 88, a mass storage device 90 and a modem 86, all coupled together by a conventional bidirectional system bus 92. The modem 86 is coupled to the internet connection for sending and receiving communications over the internet 46. The mass storage device 90 may include both fixed and removable media using any one or more of magnetic, optical or magneto-optical storage technology or any other available mass storage technology. The system bus 92 contains an address bus for addressing any portion of the memory 88 and 90. The system bus 92 also includes a data bus for transferring data between and among the processor 84, the main memory 88, the mass storage device 90 and the modem 86.

Figure 6:
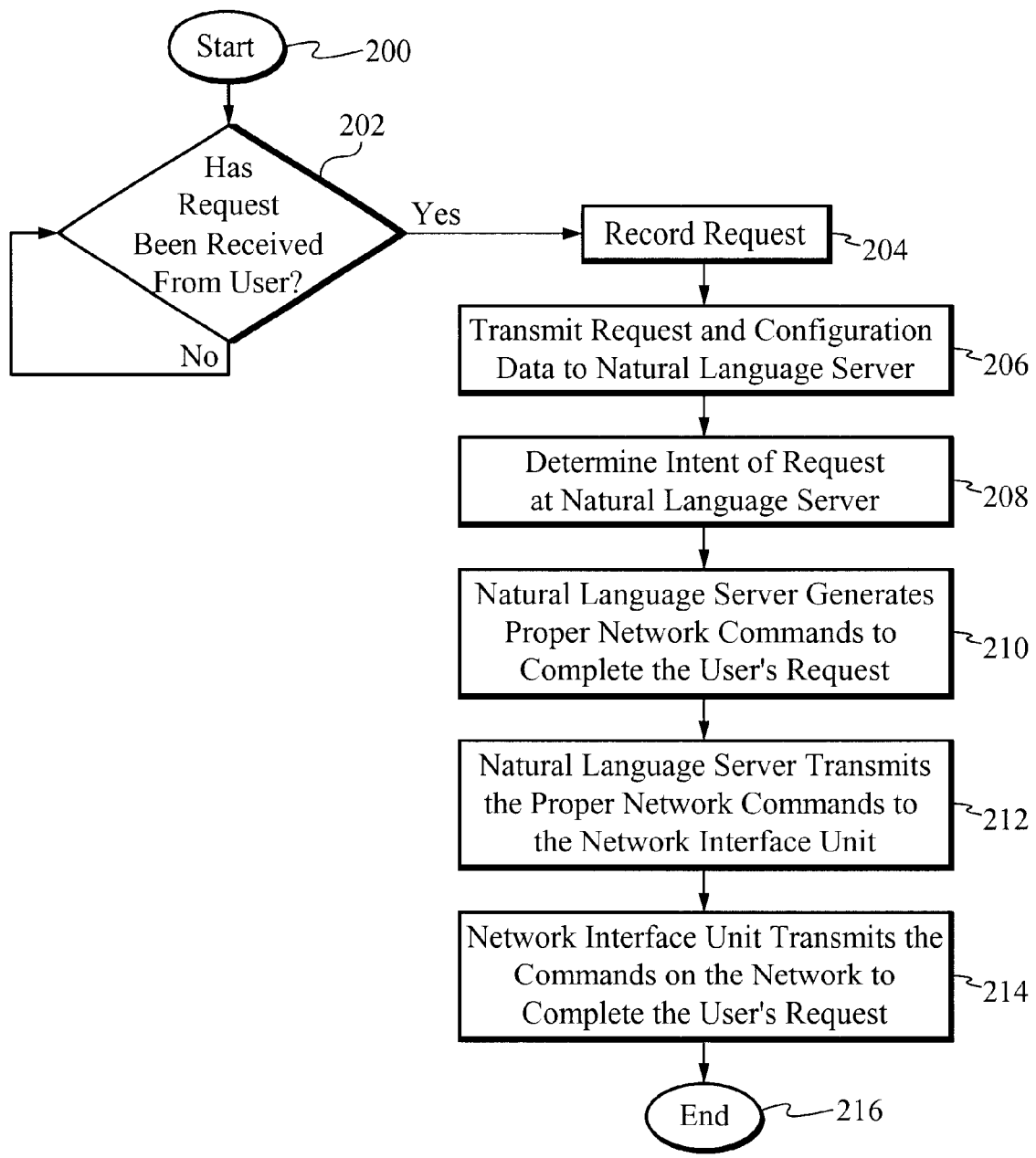
FIG. 6 illustrates a flowchart of the method of the preferred embodiment of the present invention.

A flowchart of the method of the present invention is illustrated in FIG. 6. The process begins at the step 200. The process stays at the step 202 until a natural language request or command is received from the user. Once a natural language request is received from the user, the request is then recorded at the step 204. The recorded request is then transmitted with the information regarding the configuration of the network to the natural language server, at the step 206, as described above. Preferably, this transmission is from the network interface unit 30 to the natural language server 32 over the internet 46. Alternatively, as described above, if the natural language server 32 is part of the network of devices, the transmission is from the network interface unit 30 to the natural language server 32 through the network of devices.

When the natural language server receives the recorded request from the user, the natural language server then determines the intent of the user's request, at the step 208. Preferably, the natural language server determines the intent of the user's request using well-known techniques. After the intent of the user's request is determined, the natural language server then generates the proper network commands to complete the user's request, with the devices available within the originating network of devices, at the step 210. These generated commands are then transmitted from the natural language server to the network interface unit, at the step 212, preferably over the same transmission medium used to send the original recorded request from the network interface unit to the natural language server. Once the the network interface unit receives the appropriate commands from the natural language server, the network interface unit then preferably transmits the commands to the appropriate devices over the IEEE 1394-2000 serial bus network to execute the user's request, at the step 214. The process then ends at the step 216.

Using tie apparatus and method of the present invention, a user has the ability to make a request in natural language, either spoken or entered through a keyboard or other input device. The user has the ability to request in natural language, among other things, information, such as "What time is it?" The user also has the ability to request a control action related to the devices within the network of devices, such as "watch and record channel 7," as described above.

As a further example of the operation of the system of the present invention when a user requests information, such as "What time is it?," the microphone 38 first receives the spoken request, digitizes it and then transmits it to the network interface unit 30 through the IEEE 1394-2000 serial bus network. When the network interface unit 30 receives the spoken request from the microphone 38, the network interface unit 30 stores the request. The network interface unit 30 then transmits the digitized request and information regarding the configuration of the devices within the network of devices to the natural language server 32 over the internet 46. When the natural language server 32 receives the request, the natural language server 32 first determines the intention of the request from the user. Once the natural language server 32 determines that the user has asked for the current time, the natural language server 32 then determines what the current time is at the user's location. The natural language server 32 uses resources available on the internet to obtain the information requested by the user, or alternatively, obtains the information from resources within the user's network of devices.

Once the natural language server 32 obtains the information requested by the user, in this example, the current time, the natural language server 32 then determines from the user's network of devices how to communicate the obtained information to the user. In this example, the current time could be displayed either on the digital television 34 or on the display 44, associated with the PC 42. If the natural language server 32 determines that the digital television 34 is currently on, the natural language server 32 generates commands to have the current time displayed on the digital television 34. These commands are then transmitted from the natural language server 32 to the network interface unit 30 over the internet 46.

When the network interface unit 30 receives the commands from the natural language server 32, the network interface unit 30 then transmits the commands to the appropriate devices within the IEEE 1394-2000 serial bus network. In this example, the network interface unit 30 transmits the commands to the digital television 34. When the digital television 34 receives the commands from the network interface unit 30, the digital television 34 will then display the current time for the user, as requested.

In the manner described herein, a user using the method and apparatus of the present invention has the ability to enter a natural language request within a network of devices. The user's request is then transmitted to a network interface unit which digitizes and stores the request. The network interface unit then transmits the digitized request and information about the devices within the network of devices to a natural language server, preferably over the internet. When the natural language server receives the request, the natural language server determines the intention of the request. Once the natural language server determines the intention of the request, the natural language server then determines how to complete the request with the network of devices in the user's configuration. The natural language server then generates the commands necessary to complete the user's request. The natural language server then transmits the commands to the network interface unit. When the network interface unit receives the commands, the network interface unit then transmits the commands to the appropriate devices within the network of devices. The devices then execute the received commands to complete the user's request.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394-2000 serial bus structure, the present invention could also be implemented on any other appropriate bus or network structures.

We claim:

1. A method of configuring and controlling a network of devices through a natural language request comprising:
   a. receiving a natural language request from a user;
   b. storing the natural language request;
   c. transmitting the natural language request to a natural language server;
   d. generating commands to complete the natural language request using the network of devices; and
   e. transmitting the commands to appropriate devices within the network of devices to complete the natural language request.

2. The method as claimed in claim 1 further comprising determining intention of the natural language request at the natural language server.

3. The method as claimed in claim 1 wherein transmitting the natural language request to a natural language server includes transmitting information about configuration of the network of devices.

4. The method as claimed in claim 1 wherein transmitting the natural language request to a natural language server is completed by a network interface unit within the network of devices and transmitting the commands to appropriate devices within the network of devices includes transmitting the commands to the network interface unit and then transmitting the commands from the network interface unit to the appropriate devices within the network of devices.

5. The method as claimed in claim 1 wherein the natural language request is a selective one of a spoken request and a request entered using an input device.

6. The method as claimed in claim 1 wherein the natural language request is requesting a selective one of information and a control action to be performed within the network of devices.

7. The method as claimed in claim 1 wherein the natural language server is remote from the network of devices.

8. The method as claimed in claim 7 wherein the natural language server is accessed over an internet connection.

9. The method as claimed in claim 1 wherein the natural language server is included within the network of devices.

10. The method as claimed in claim 1 wherein the network of devices substantially complies with a version of the IEEE 1394 standard.

11. A network interface unit for receiving a natural language request from a user, the network interface unit comprising:
    a. a first interface configured to communicate with one or more devices within a network of devices to receive the natural language request from the user;
    b. a second interface configured to communicate with a natural language server to transmit the natural language request to the natural language server and to receive commands back from the natural language server to execute the natural language request within the network of devices; and
    c. a control circuit coupled to the first interface to control the communication with the one or more devices and to the second interface to control the communication with the natural language server, wherein when the natural language request is received by the first interface, the natural language request is transmitted to the natural language server and further wherein when the commands are received back from the natural language server, the commands are transmitted from the first interface to the network of devices to execute the natural language request.

12. The network interface unit as claimed in claim 11 wherein information about configuration of the network of devices is also transmitted to the natural language server.

13. The network interface unit as claimed in claim 11 wherein the natural language request is a selective one of a spoken request and a request entered using an input device.

14. The network interface unit as claimed in claim 11 wherein the natural language request is requesting a selective one of information and a control action to be performed within the network of devices.

15. The network interface unit as claimed in claim 11 wherein the natural language server is remote from the network of devices.

16. The network interface unit as claimed in claim 15 wherein the second interface provides an internet connection through which the natural language server is accessed.

17. The network interface unit as claimed in claim 11 wherein the natural language server is included within the network of devices.

18. The network interface unit as claimed in claim 17 wherein the first and second interfaces are integrated into a single interface circuit.

19. The network interface unit as claimed in claim 11 wherein the network of devices substantially complies with a version of the IEEE 1394 standard.

20. A natural language server for receiving a natural language request and generating commands to complete the natural language request within a network of devices, the natural language server comprising:
   a. an interface circuit configured to receive the natural language request from a network interface unit; and
   b. a control circuit coupled to the interface circuit and configured to process the natural language request and generate commands necessary to execute the natural language request within the network of devices, wherein the commands are transmitted to the network interface unit through the interface circuit.

21. The natural language server as claimed in claim 20 wherein information about configuration of the network of devices is also received by the interface circuit from the network interface unit.

22. The natural language server as claimed in claim 20 wherein the natural language request is a selective one of a spoken request and a request entered using an input device.

23. The natural language server as claimed in claim 20 wherein the natural language request is requesting a selective one of information and a control action to be performed within the network of devices.

24. The natural language server as claimed in claim 20 wherein the natural language server is remote from the network of devices.

25. The natural language server as claimed in claim 24 wherein the interface circuit provides an internet connection for communicating with the network interface unit.

26. The natural language server as claimed in claim 20 wherein the natural language server is included within the network of devices.

27. The natural language server as claimed in claim 20 wherein the network of devices substantially complies with a version of the IEEE 1394 standard.

28. A network of devices comprising:
   a. one or more devices;
   b. a natural language server comprising:
      i. a first interface configured to receive a natural language request; and
      ii. a first control circuit coupled to the first interface and configured to process the natural language request and generate commands necessary to execute the natural language request within the one or more devices; and
   c. a network interface unit comprising:
      i. a second interface configured to communicate with the one or more devices to receive the natural language request from a user;
      ii. a third interface configured to communicate with the natural language server to transmit the natural language request to the natural language server and to receive the commands back from the natural language server to execute the natural language request within the one or more devices; and
      iii. a control circuit coupled to the second interface to control the communication with the one or more devices and to the third interface to control the communication with the natural language server, wherein when the natural language request is received by the first interface, the natural language request is transmitted to the natural language server and further wherein when the commands are received back from the natural language server, the commands are transmitted from the second interface to the one or more devices to execute the natural language request.

29. The network of devices as claimed in claim 28 wherein information about configuration of the one or more devices is also transmitted from the network interface unit to the natural language server.

30. The network of devices as claimed in claim 28 wherein the natural language request is a selective one of a spoken request and a request entered using an input device.

31. The network of devices as claimed in claim 28 wherein the natural language request is requesting a selective one of information and a control action to be performed by the one or more devices.

32. The network of devices as claimed in claim 28 wherein the natural language server is remote from the one or more devices.

33. The network of devices as claimed in claim 32 wherein the first interface and the third interface communicate over an internet connection.

34. The network of devices as claimed in claim 28 wherein the natural language server is coupled locally with the one or more devices.

35. The network of devices as claimed in claim 34 wherein the second and third interfaces are integrated into a single interface circuit.

36. The network of devices as claimed in claim 28 wherein the one or more devices and the network interface circuit are coupled together within a network substantially complying with a version of the IEEE 1394 standard.

37. A method of configuring and controlling a network of devices through a natural language request comprising:
   a. receiving a natural language request from a user;
   b. storing the natural language request;
   c. transmitting the natural language request to a natural language server;
   d. determining an intention of the user from the natural language request;

e. generating commands to complete the intention using the network of devices; and e. transmitting the commands to appropriate devices within the network of devices to complete the natural language request.

38. A method of configuring and controlling a network of devices through a natural language request comprising:

a. receiving a natural language request from a user;

b. storing the natural language request;

c. transmitting the natural language request to a natural language server;

d. determining if the natural language request is a spoken request or a request entered using an input device;

e. converting the natural language request from speech to data using speech recognition when the natural language request is a spoken request;

f. generating commands to complete the natural language request using the network of devices; and g. transmitting the commands to appropriate devices within the network of devices to complete the natural language request.

\* \* \* \* \*

UNITED STATES PATENT AND TRADEMARK OFFICE
CERTIFICATE OF CORRECTION

PATENT NO.    : 6,895,379 B2
DATED         : May 17, 2005
INVENTOR(S)   : Scott David Smyers, Glen David Stone and Bruce Alan Fairman It is certified that error appears in the above-identified patent and that said Letters Patent is hereby corrected as shown below:

Title page, Item [54] and Column 1, lines 1-6,
Title, replace "METHOD AND APPARATUS FOR CONFIGURING AND CONTROLLING HOME ENTERTAINMENT SYSTEMS THROUGH NATURAL LANGUAGE AND SPOKEN COMMANDS USING A NATURAL LANGUAGE SERVER" with -- CONTROLLING HOME ENTERTAINMENT SYSTEMS USING A NATURAL LANGUAGE SERVER --.

Column 3,
Line 11, replace "neighbors" with -- neighbor --.

Column 10,
Lines 10 and 58, replace "tie" with -- the --.
Line 51, replace "the the" with -- the --.

Signed and Sealed this

Twenty-eighth Day of February, 2006

JON W. DUDAS
*Director of the United States Patent and Trademark Office*